United States Patent Office 2,760,972
Patented Aug. 28, 1956

2,760,972

METHOD OF MAKING PHTHALATE ESTERS

Homer van Beuren Joy, Montclair, N. J., assignor to Lyndhurst Chemical Corporation, a corporation of New Jersey No Drawing. Application May 29, 1951,
Serial No. 229,000

3 Claims. (Cl. 260—475)

This invention relates to compositions containing esters of orthophthalic acid and more particularly to such esters where the esterifying group is derived from methyl isobutyl carbinol resulting in methyl amyl esters of orthophthalic acid, to compositions containing such esters, to methods of producing such compositions, to coating and molding compositions containing such esters particularly in combination with resins, and to methods of making such compositions.

The esters of orthophthalic acid have great commercial importance. Their principal uses lying in the field of plasticizers and in alkyd resins. The dimethyl and diethyl esters and a few others are used as cellulose acetate plasticizers. Dibutyl phthalate is the most widely used plasticizer for nitro cellulose. Several dioctyl phthalates have been used in the vinyl field. Of the latter, the 2-ethyl hexyl isomer is by far the most common. It is known to the trade as dioctyl phthalate or simply as DOP, and it is commonly used as a plasticizer for polyvinyl chloride film which is employed for ladies' aprons, vinyl leather, and for many other purposes.

Dioctyl phthalate is the standard plasticizer for polyvinyl chloride or polyvinyl chloride-acetate. Its volatility is low and its stability to heat and ultraviolet light are outstanding. In milling formulae, about 50 parts of dioctyl phthalate are commonly used with 100 parts of polyvinyl chloride together with small amounts of lubricant and stabilizer. In extrusion compounds the plasticizer content may be as low as 35 parts. Dioctyl phthalate may be used as the sole plasticizer but it is more common to use a formula in which about 15 to 30% of the plasticizer is a phosphate such as tricresyl phosphate, to impart flame-proofing, and/or 15 to 50% of an aliphatic plasticizer which improves the cold flex and hand, such as, methoxyethyl acetyl ricinoleate, dioctyl adipate or dioctyl sebacate, and the like. Polymeric plasticizers are sometimes used. Dioctyl phthalate usually comprises 50% or more of these plasticizer mixtures. In lacquer use, the plasticizer content is usually about 0 to 40 parts of plasticizer per 100 parts of resin by weight, and dioctyl phthalate is often used as the sole plasticizer.

The dioctyl phthalates referred to above are relatively more expensive than is necessary in many utilizations, and in addition the supply of some of them is quite limited. However difficulties arise when an attempt is made to produce esters of secondary alcohols in the yield and quality necessary for commercial utilization. It is quite easy to prepare esters of primary alcohols such as dibutyl phthalate. Phthalic anhydride may be heated under reflux with an excess of the alcohol in the presence of a small amount of sulfuric acid as a catalyst. The water of esterification is generally removed by distillation into a trap. In cases where the alcohol is completely water-soluble, a low boiling hydrocarbon, such as benzene, is often added to bring about separation of the water. There is no trouble with olefine formation.

But the direct esterification of secondary alcohols in the presence of said catalysts is more difficult because, in addition to esterification, side reactions such as olefine formation always occur. In some instances, the olefine may even become the major product. Also, orthophthalic acid has two carboxyl groups in adjacent positions on the benzene nucleus, which results in steric hindrances (mechanical interference with the reaction). This retards esterification and thereby increases the possibility of excessive olefine formation. Certain secondary alcohols, such as di-isopropyl carbinol fail to give satisfactory yields of phthalic esters. Other secondary alcohols may be esterified with good yield, but the reaction conditions must be carefully adjusted to fit the individual case if such yield and satisfactory product is to be obtained. For these reasons it is evident that it is impossible to predict a priori how any individual secondary alcohol will react with phthalic anhydride.

Consideration must also be given to the nature of the esterification reaction itself. An esterification which takes a relatively long time, is more expensive to carry out among other things because there is less out-put per day from a given piece of equipment. But attempts to increase out-put by usual methods of increased temperatures with or without superatmospheric pressure give rise to conditions frequently under which olefines in excessive amounts are produced when esterification is attempted with secondary alcohols.

Among the objects of the present invention is the production of compositions containing methyl amyl phthalates of particular value specifically for plasticizing compositions containing nitro cellulose or polyvinyls.

Other objects include the productions of such compositions containing the resins with the phthalates.

Still further objects include methods of economically and feasibly producing high yields of the desired esters.

Further objects include methods of producing the stated compositions.

Still further objects and advantages of the present invention will appear from the more detailed description set forth below it being understood that such more detailed description is given by way of illustration and explanation only, and not by way of limitation, since various changes therein may be made by those skilled in the art without departing from the scope and spirit of the present invention.

In accordance with the present invention compositions are produced which contain a methyl amyl phthalate that is a phthalate ester obtained from methyl isobutyl carbinol. The ester may be one in which only one of the carboxyl groups of phthalic acid is esterified with the methyl isobutyl carbinol, or both of the carboxyl groups in phthalic acid may be so esterified, or one of the carboxyl groups may be esterified with methyl isobutyl carbinol and the other esterified with a primary aliphatic octyl alcohol particularly 2-ethyl-hexanol. Since in the complex mixtures produced by esterification reactions, the number of carboxyl groups esterified may be fractional, the methyl amyl phthalate product which is obtained is desirably one which has at least 0.8 of the phthalate carboxyl groups esterified by the methyl isobutyl carbinol and as noted the remaining groups may be esterified with a primary octyl alcohol such as 2-ethyl-hexanol or all of the phthalate carboxyl groups may be esterified by methyl isobutyl carbinol.

It has been found that high yields of desirable methyl amyl phthalate products may be produced under carefully controlled conditions. It has been found in the esterification of phthalic acid or anhydride by the secondary alcohol methyl isobutyl carbinol, the reaction temperature is critical. Above about 165° C., olefine formation becomes excessively rapid and beyond 170° C. as a general rule, the production of olefine interferes with the desired yields of the ester product. When the temperature reaches as high as 180° the olefine production becomes quite rapid. Accordingly a temperature above 100° C. or even lower when vacuum is employed or there is a large quantity of low boiling diluent, represents the lowest limit to which one would normally go while for ordinary purposes the maximum temperature employed is 170°. A reaction temperature of from about 148 to 156° C. has been found to give about the optimum results with desired rapidity of reaction, while resulting in a minimum of olefine formation. Thus with one mol of phthalic anhydride, 2.5 mols of carbinol, and 1% of p-toluene sulphonic acid, 96.1% of di-ester was formed in 7½ hours. The temperature control may be effected in any suitable way as by the application of a small amount of pressure, by change in the rate of heating, by removal of olefine, or by varying the amount of carbinol in the reaction zone.

In preparing the mixed esters the phthalic anhydride may be reacted with methyl isobutyl carbinol to form the half-ester and then a primary octyl alcohol added to complete the esterification in a much shorter time than is possible when the carbinol alone is used. In addition, the resulting hexyl octyl ester is less volatile than the di-(methyl amyl) ester. The 1–1(molar) ester is low enough in volatility to be used as the sole phthalate plasticizer in many vinyl formulae. It can be made in almost as short a time as can dioctyl phthalate. Such hexyl octyl esters even exhibit somewhat more efficiency as a vinyl plasticizer when compared with the dioctyl phthalate in that a given percentage will produce a slightly softer compound than a corresponding percentage of dioctyl phthalate. But because they can be made rapidly and utilize available secondary alcohols, a new ester is supplied for utilization in the vinyl and nitro cellulose fields.

In preparing the mixed esters, it has been found that the exothermic reaction with the carbinol is ordinarily substantially complete in 20 to 25 minutes or less after the anhydride is melted and mixed with the carbinol. During this reaction it is preferred to keep the temperature at about 140–155° to minimize olefine formation. However when the major part of the carbinol has reacted to form the half-ester, the temperature may be raised. The final top temperature may be as high as 186° C. or higher for a substantially 1–1 ester, whereas when the carbinol alone is used, excessive amounts of olefine are formed above 170° C. and consequently in the latter instance it is preferred to operate around 155° C. The presence of large amounts of octanol appears to exert a protective effect on the methyl isobutyl carbinol. This effect may be due in part to the shorter time required for esterification, in part because there is less free carbinol present and also possibly because of a favorable catalytic effect.

The type of catalyst employed is also of importance. Sulfuric acid is almost universally used as the catalyst for preparing phthalate esters. However when it is used with methyl isobutyl carbinol, in esterification reactions with phthalic acid or anhydride, sulfuric acid gives excessive amounts of olefine formation. In a run with one mol of phthalic anhydric, 2.4 mols of carbinol, and 0.1% of sulfuric acid, the yield of ester was only 70.8%. While under some varying conditions, somewhat better results may be obtained, the olefine formation is undesirable. It has been found that sulfonic acids may very desirably be employed as the catalyst in the esterification of phthalic acid or anhydride with the methyl isobutyl carbinol in the production of esters of the character set forth above. The sulfonic acids are excellent catalysts for this particular reaction, give rapid conversion, and only small amounts of olefine are produced provided that the temperature is properly controlled as indicated above. So that there is a correlation here also between the type of catalyst employed and the temperatures utilized in the reaction in maintenance of critical conditions for minimizing undesired production of olefine, and loss in yield.

A variety of sulfonic acids may be used as a catalyst either aliphatic or aromatic sulfonic acids employed. Thus alkane sulfonic acids such as methane or ethane sulfonic acids or "mixed alkane" sulfonic acids give good results. The "mixed alkane" sulfonic acids are commercially available and are a mixture of the lower homologues, having an average molecular weight of 110. They give results roughly equivalent to those obtained with an equal rate of ethane sulfonic acid. When used in amounts as large as 1%, the aliphatic sulfonic acid sometimes bring about the formation of a volatile color which may be removed by an absorbent such as activated charcoal. But accordingly lower quantities are preferred such as 0.2 to 0.4% for minimum color production although the amounts of the aliphatic sulfonic acids may run considerably higher such as up to 5% and any ordinary catalytic amount may be employed.

The aromatic sulfonic acids are preferred catalysts. Such sulfonic acids for example include paratoluene sulfonic acid, naphthalene sulfonic acids, xylene sulfonic acids, etc. They may be used in amounts as high as 5% or more, but there is no great necessity in using amounts in excess of about 1% based on the total charge. As little as 0.4% or less may be used although the reaction may be somewhat slower.

The methyl amyl phthalate esters referred to herein may as indicated be particularly utilized in plasticizing resins including nitro cellulose and polyvinyls. Any of the ordinary nitro celluloses employed in lacquer type coatings may be utilized including the low viscosity nitro celluloses and the normal viscosity materials. The most common is the RS (regular soluble) type. It is soluble in esters, ketones, or ether-alcohols, and it contains 11.8 to 12.2% of nitrogen. The AS type is of rather small importance. It contains 11.2–11.7% nitrogen. It is soluble in the same solvents but alcohol is more suitable than hydrocarbons as the diluent. The SS type contains about 10.7 to 11.2% nitrogen. The lower viscosities are almost completely soluble in mixtures of alcohol and toluene. The esters of the present invention can be used with any of these nitrocelluloses in the different viscosities from ¼ second and below up to 1000 Hercules seconds. The most important are the ½ and ¼ second RS types for lacquers and the 5–6 second or 15–20 second RS for knife or roller coating.

The polyvinyls include polyvinyl chloride or the polyvinyl chloride-acetate polymers etc. The esters of the present invention may be used with any of the commercial vinyl chloride acetate copolymers as for example which contain from 86 to over 95% of vinyl chloride or with straight polyvinyl chloride in both high and low molecular weights.

The amounts of methyl amyl phthalate employed may be from 10 to 75 parts by weight of such ester to 100 parts of the resin stating overall percentages. Considering its application in particular compositions, the di-(methyl amyl)phthalate is particularly useful as a plasticizer in vinyl film where the film may be of any desired character as indicated above. In such cases the preferred overall ratios are from 20 to 60 parts of phthalate to 100 parts by weight of polyvinyl and this applies to any of the methyl amyl phthalates of the present invention and any of the polyvinyl materials referred to above. Thus a composition comprising 25 parts of di-methyl amyl phthalate with 25 parts of dioctyl phthalate and 100 parts of polyvinyl chloride (all by weight) with a small usual amount of stabilizer and lubricant will give an excellent 4 mil film satisfactory for general purposes. Or if desired the di-(methyl amyl) phthalate may be used as the sole plasticizer in such compositions particularly for thick sections where low volatility is not as essential. The di-(methyl amyl) phthalate produced in accordance with the present invention is low enough in volatility to replace up to about 50% of the dioctyl phthalate in most of the standard vinyl film formulations at a considerable saving in cost.

In general as to lubricants and stabilizers, the following is noted. Lubricants are greasy in nature. They are usually stearic acid or a metallic stearate such as a lead or a calcium stearate and are used at 0.5 to about 1 part per 100 parts of resin. Stabilizers are more complicated. Their most important single action is to absorb HCl which tends to form when the composition is processed at high temperature. Any metallic salt of a weak acid can act in this way. The salts of lead are the most used. Other common materials are weak-acid salts of calcium such as the stearate or salts of barium or cadmium. Vinyl stabilizers may also act as antioxidants (lead salicylate), as ultraviolet screens, or as color reducers by dienophylic action (tribasic lead maleate). A stabilizer which acts in all four ways is dibasic lead phosphite. They are generally used at 3 to 7 parts per 100 parts of resin.

Or as indicated, the di-(methyl amyl)phthalate and other phthalate esters produced in accordance with the present invention are excellent plasticizers for nitro cellulose lacquers where they may replace dibutyl phthalate for all or practically all purposes and have the advantage of lower volatility, etc. Ordinarily they may be used in from 10 to 50 parts by weight per 100 parts of nitro cellulose although for certain uses there may be as much as 75 parts of such plasticizer to 10 parts of nitro cellulose.

The following examples will illustrate the invention all parts being by weight unless otherwise indicated.

*Example 1*

One mol, 148.1 grams, of phthalic anhydride was mixed with 2.4 mols, 245.3 grams, of methyl isobutyl carbinol and 0.2%, 0.78 gram of mixed alkane sulfonic acids whose average molecular weight was 110. The mixture was heated under reflux by means of an oil bath for 19 hours and the water of esterification was continuously separated by means of a trap. The ester was washed with sodium carbonate solution and fractionally distilled. The yield of ester was 91.9% of the theoretical based on the phthalic anhydride and 76.5% on the carbinol. For recycling operation, where credit can be taken for recovered materials, the yields are about 95% based on the phthalic anhydride and 87% based on the carbinol. The mid-boiling point of the ester was 185° C. at a pressure of approximately 4 millimeters of mercury, and the specific gravity was 0.996 at 20/20° C.

*Example 2*

14 mols of phthalic anhydride, 33.6 mols of methyl isobutyl carbinol and 0.3% of mixed alkane sulfonic acids were reacted for 21 hours. At the end of this time, the acid number was down to 5. 4160 grams of di-(methyl amyl)phthalate was obtained and this may be increased by refractionation of the intermediate cut.

In these examples, it is preferred to dissolve the catalyst in the cold carbinol and to employ stirring or shaking during the solution and reaction of the phthalic anhydride in order to avoid the possibility of an excessive rise in the temperature or local superheating.

*Example 3*

This is a desirable example because of the shorter time required. 1 mol, 148.1 grams of phthalic anhydride was reacted with 2.5 mols, 255.5 grams of methyl isobutyl carbinol in the presence of 1% (4.04 grams) of paratoluene sulfonic acid. The temperature was maintained at 148–157° C. except for a short time at the beginning and at the end when it was slightly lower. 96.1% (based on the phthalic anhydride) of di-(methyl amyl)phthalate was formed in 7½ hours.

As the esterification proceeds an increasing amount of an olefine which boils at about 54° C. is formed and this tends to lower the reaction temperature unless it is removed or unless pressure is applied. If superatmospheric pressure is employed, this must be done with great caution because there is a marked increase in olefine formation above about 158–170° C. and even a very brief exposure to 180° will bring about a large increase in olefine formation. The rate of heating and the holdup of the column and trap have an important effect on the reaction temperature.

*Example 4*

1 mol, 148.1 g. of phthalic anhydride was reacted with 1.2 mols, 122.6 g. of methyl isobutyl carbinol in the presence of 1.71 g. (0.4% on the final charge) of paratoluene sulfonic acid at 140–155° C. The exothermic reaction was complete in less than 25 minutes after the mixture became homogeneous. 1.2 mols, 156.2 g. of 2-ethyl hexanol was then added and the temperature was gradually raised to 180–185° C. In a total time of 3½ hours the acid number dropped to 9.0 and 20.5 cc. of water separated.

The product was then washed with sodium carbonate solution and fractionally distilled. 21.2 g., 0.21 mol (containing a little olefine) was recovered in the carbinol fraction and 16.2 g., 0.12 mol of octanol was also recovered. The ester was then distilled at 168–187° C. at approximately 1 millimeter pressure. The mid-boiling point was 181° and the yield was 333.6 g. or 92.0% based on the anhydride and calculated as a 1-1 ester. On the basis of the recovered octanol, the ester actually contained 1.08 mols of octanol and 0.92 mol of carbinol. To get a color of 25 or less on the American Public Health Association (APHA) scale, treatment with an adsorbent such as activated charcoal may be required, or a bleaching agent used.

*Example 5*

| | Parts by weight |
|---|---|
| Polyvinyl chloride "Geon 101" | 100 |
| Ester of Example 4 | 30 |
| Tricresyl phosphate | 7.5 |
| Dioctyl sebacate | 12.5 |
| "Plumbosil B" (coprecipitated lead orthosilicate and silica gel—having a PbO content of 48–50% stabilizer) | 4 |
| Dibasic lead stearate (stabilizer-lubricant) | 0.75 |

This mixture was milled on a rubber mill at 290° F. to give an excellent, general purpose, 4 mil film. "Geon 101" is a polyvinyl resin which is a vinyl chloride polymer having a specific gravity 1.40±.05, specific viscosity in nitrobenzene 0.52–0.57, and characterized by thermal and light stability, toughness and chemical inertness.

*Example 6*

| | Parts by weight |
|---|---|
| Polyvinyl chloride (high mol. wt. "Geon 101") | 100 |
| Di-(methyl amyl)phthalate | 25 |
| Dioctyl phthalate | 25 |
| Dibasic lead phosphite (stabilizer) | 4.0 |
| Dibasic lead stearate (stabilizer-lubricant) | 0.75 |

This mixture was milled on a rubber mill at 290° F. An excellent 4 mil film was obtained. It showed only slight stiffening after 160 hours of carbon arc at 105° F. The heat stability was as good as that obtained with dioctyl phthalate. The brittle point test was passed at −20° F. which is low enough for most purposes. Resistance to washing was satisfactory and it exhibits satisfactory electrical properties.

*Example 7*

A clear lacquer having the following composition was prepared:

| | Percent |
|---|---|
| Dry, RS ½ second nitrocellulose | 10 |
| Hard rosin maleic resin "Beckacite 1110" | 10 |
| Di-(methyl amyl) phthalate | 10 |
| Butyl acetate | 25 |
| Butanol | 25 |
| Toluene | 20 |

The lacquer was similar to the lacquer obtained with a slightly smaller amount of dibutyl phthalate. Extensive tests have indicated that di-(methyl amyl) phthalate can serve as a direct substitute for dibutyl phthalate except that a slightly greater amount should be used to obtain equal flexibility, and it has the advantage of lower volatility. It is compatible with castor oil, tricresyl phosphate and the usual resins which are used with nitrocellulose such as; alkyds, rosin maleics, chlorinated polyphenyl, and the like. "Beckacite" is a resin maleic synthetic resin manufactured by Reichhold Chemicals, Inc., having an acid number of 20–30 and a melting point of 199–215° F.

*Example 8*

| | Parts by weight |
|---|---|
| "Geon 101" | 100 |
| Ester of Example 4 | 50 |
| "Plumbosil B" (coprecipitated lead orthosilicate and and silica gel, having a PbO content of 49–50% stabilizer) | 4 |
| Dibasic lead stearate (stabilizer-lubricant) | 0.75 |
| Normal lead salicylate (stabilizer) | 0.40 |

This mixture was milled on a rubber mill at approximately 305° F. It gave an excellent, general purpose 4 mil sheet which was translucent. The fuming on the hot mill was somewhat greater than that of a control made with dioctyl phthalate, but it was not excessive. To minimize loss, the extremely high temperatures (up to 350° F.) which are sometimes used with dioctyl phthalate should be avoided.

*Example 9*

| | Percent by weight |
|---|---|
| Dry ½ second, RS nitrocellulose | 12 |
| Di-(methyl amyl) phthalate | 4 |
| Ester gum | 10 |
| Denatured ethanol | 10 |
| Ethyl acetate (85–88% grade) | 40 |
| Toluene | 10 |
| Butyl acetate | 14 |

This lacquer gave a clear, high-quality, flexible film.

The compositions containing an ester produced in accordance with the present invention with resins such as nitro-cellulose and the polyvinyl may be produced for later incorporation of solvents, plasticizers and other types of ingredients commonly employed in the production of coating compositions, film, etc. So that the compositions of the resins with esters may be employed as entities for shipment and subsequently incorporated with the additional components commonly used in the art for the production of the final composition desired.

Having thus set forth my invention, I claim:

1. The method of making a composition containing an orthophthalic ester of methyl isobutyl carbinol which comprises heating at from 140 to 170° C. while continuously removing water from the reaction zone, a phthalic reactant selected from the group consisting of ortho phthalic acid and phthalic anhydride with methyl isobutyl carbinol in amount to esterify at least 0.8 of the carboxyl groups of the phthalic reactant in the presence of a catalytic amount of a sulfonic acid selected from the group consisting of aliphatic and aromatic sulfonic acids at a temperature below that of formation of olefines in substantial amount.

2. The method as in claim 1 in which the amount of carbinol is in excess.

3. The method as in claim 1 in which the amount of carbinol is sufficient to esterify from 0.8 to 1.75 of the carboxyl groups of the phthalic reactant, and thereafter heating the reaction product from the first mentioned heating step with an amount of a saturated primary aliphatic octyl alcohol in the presence of an esterification catalyst at a temperature below 186° C. to form an octyl methyl-amyl phthalate.

References Cited in the file of this patent

UNITED STATES PATENTS

| 1,702,188 | Young | Feb. 12, 1929 |
| 1,993,552 | Izard | Mar. 5, 1935 |
| 1,993,736 | Graves et al. | Mar. 12, 1935 |
| 2,325,951 | Gresham | Aug. 3, 1943 |
| 2,610,201 | Rutherford | Sept. 9, 1952 |

OTHER REFERENCES

Groggins: Unit Processes, In Org. Synthesis, pages 625–6, 643, McGraw (3rd ed.) 1947.

Solvents, Durrans fifth ed. published by D. Van Nostrand Co., Inc., New York, 1944, page 17.